United States Patent Office 3,473,143
Patented Oct. 14, 1969

3,473,143
COLD-CATHODE GLOW-DISCHARGE
RING LASER
Derrick George Simmons, Burgess Hill-Sussex, and James Smith, Salfords, near Red Hill, England, assignors, by mesne assignments, to U.S. Philips Corporation, New York, N.Y., a corporation of Delaware
Filed Oct. 6, 1965, Ser. No. 493,420
Claims priority, application Great Britain, Oct. 7, 1964, 40,966/64
Int. Cl. H01s 3/05
U.S. Cl. 331—94.5          7 Claims

ABSTRACT OF THE DISCLOSURE

A ring laser is disclosed which employs a plurality of cathodes and an anode disposed within an envelope which encloses both a ring path and the cathodes. A glow discharge is produced and hence population inversion in the gaseous atmosphere within the envelope, a laser beam being produced along the ring path into the region occupied, in operation, by the negative glow portion of the discharge.

Figure 1:
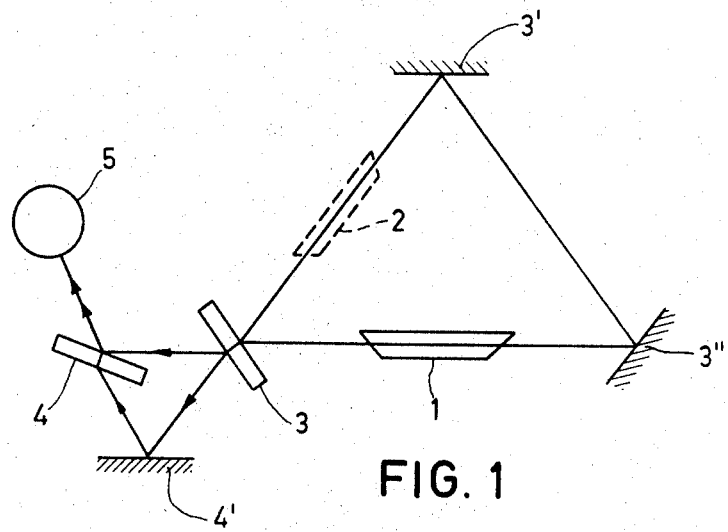

This invention relates to gas laster systems. In particular it relates to so-called "ring" laser systems. Examples of such laser systems are described by Rosenthal in the Journal of the Optical Society of America, volume 52, page 1143, or by Macek and Davis in App. Phys. Letters, volume 2, page 67, Feb. 1, 1963.

In ring laser systems light beams are arranged to travel in an optical path which is closed loop (not necessarily symmetrical). A laser atmosphere having a "negative temperature" population inversion of excited atoms is arranged in this path and, if sufficient gain is produced in this atmosphere or in a combination of such atmospheres, oscillations can occur in both directions around the path. If the device and therefore the path is stationary with respect to inertial space, then the resonator which it forms is symmetrical with respect to light travelling in either direction and the two contra-rotating beams have identical frequencies.

If the device and therefore the path rotates about an axis perpendicular to its own plane the two light beams change in frequency, one increasing its frequency, the other decreasing its frequency. The difference between the two frequencies can be shown to be proportional to the angular velocity of rotation of the device. The laser can therefore be used to measure angular velocity or, by means of a feedback system which acts to reduce this difference of frequency, as a gyroscope.

The laser atmospheres normally used for this application are gaseous and are pumped by radio-frequency oscillations. In order to obtain a single mode of oscillation the radio-frequency pump power must be adjusted critically so that the atmosphere is operating just above the threshold level of the laser.

Gas laser atmospheres can also be excited by direct current discharges passing through them and it may be possible to adjust the pump power for these direct-current discharge excited atmospheres more critically than for radio-frequency excited atmospheres. The most common form of direct-current gas discharge laser utilises the positive column part of the discharge to excite the gas atmosphere to produce the so-called "negative-temperature" distribution therein. However, if such a positive column discharge laser atmosphere is incorporated in a ring laser system, the system suffers from the disadvantage that the current discharge passing along the path of the laser beam in the gas tends to produce a drift of excited atoms along this path. This drift effects the difference frequency generated and is likely to produce a frequency difference between the laser beams passing in the two directions even when the laser path is stationary with respect to inertial space. It is possible to overcome this disadvantage by using two positive column discharge laser atmospheres in the path of the beams so that the electric discharge causes the excited atoms to drift in opposite directions along the path in the two atmospheres.

It is an object of the invention to provide an alternative solution to this problem.

A co-pending commonly assigned application Ser. No. 397,731 a gas discharge laser is disclosed wherein the "negative glow" portion of the gas discharge is utilized to produce the negative temperature distribution in the atmosphere of excited atoms, by causing the laser beam to extend into the region occupied, in operation by the negative glow portion of the discharge. This may be done, for example, by causing the laser beam to pass along and adjacent the surface of a flat cathode electrode, an anode electrode being arranged on the opposite side of the path to this cathode. The direction of the electron and ion flow of the discharge may in this way be made to lie approximately at right angles to the optical path.

The invention provides a cold-cathode glow-discharge ring laser system comprising an envelope containing a gaseous atmosphere, said envelope also containing a cathode and an anode for co-operating to produce the glow discharge and hence population inversion in said atmosphere, the laser system also comprising means for producing a laser beam along a ring path extending into the region occupied, in operation, by the negative glow portion of the discharge.

Said cathode and anode may be arranged so that the glow discharge occurs in a direction substantially perpendicular to said ring path. Thus any preferential direction of drift of excited atoms in the gas atmosphere may be arranged to also occur substantially at right angles to this path with the result that the frequency difference which occurs with positive column laser atmospheres arranged in a ring optical path when the laser is stationary may be substantially reduced.

The ring laser may comprise one or more individual negative glow laser tubes arranged in the path. However, use may be made of a second property of the negative glow laser whereby, in an envelope containing the laser gas atmosphere, excitation may be made to occur only in the region of the cathode and not in the majority of the space bounded by the envelope walls as in the case of radio frequency or positive column excited lasers. Thus said envelope may completely enclose said ring path and also enclose a plurality of said cathodes disposed along said ring path. In this case the envelope may be arranged to co-operate with said cathode as an anode for the discharge.

The envelope may contain a photo-detector for the laser beam, either as a separate envelope enclosed device, for example a vacuum photo-cell or as a device with an open structure, for example a photo-sensitive cell or a structure similar to that of a conventional gas-filled photo-cell sharing the laser atmosphere.

The mirrors which are necessary to form the closed loop may also be provided within the envelope.

The invention will now be described, by way of example, with reference to FIGURES 1, 2, 3 and 4 of the drawing.

FIGURE 1 of the drawings shows a first embodiment in which the optical ring path is defined by mirrors 3, 3' and 3''. A negative glow laser tube 1 is disposed in the path between the mirrors 3 and 3''. As additional negative glow laser tube 2 may also be provided in the path between the mirrors 3 and 3' and/or between the mirrors 3' and 3"; it is shown provided between the mirrors 3 and 3'. The mirror 3 is arranged to be partly transparent so that a portion of the light travelling clockwise round the path may impinge upon the mirror 4 and a portion of the light travelling anticlockwise round the path may impinge upon the mirror 4'. Mirror 4 is again arranged to be partly transparent so these portions of light may be combined at a photo-detector 5. Rotation of the laser path in the plane of the drawing will thus cause a best frequency signal to be obtained from the detector 5. If the cathodes in the laser tubes 1 and 2 are in the form of plates these plates may for example be orientated so that each one lies in a plane parallel to or perpendicular to the plane of the optical ring path but in either case substantially parallel to the direction of said path.

Figure 2:
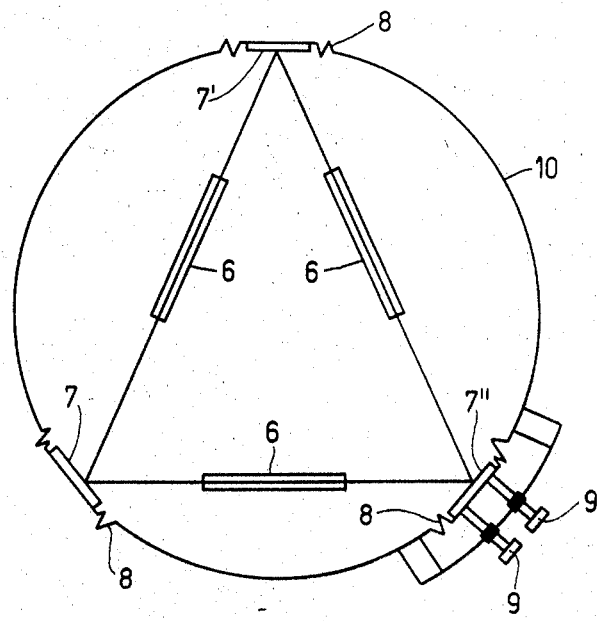

FIGURE 2 shows a second embodiment comprising three flat discharge cathode strips 6 arranged adjacent to an optical path formed by mirrors 7, 7' and 7". These cathode strips may be arranged within a common envelope 10 in the form of, for example a shallow closed metal cylinder of diameter, for example, 25 cm., the top and bottom of this cylinder lying in planes parallel to the plane of the drawing. The envelope may contain, for example, a 2% Ne/98% He gas mixture at a pressure of 20 mm. Hg. Electrical connections to the cathode may be made via glass or ceramic vacuum-tight seals through the metal envelope. Anode electrodes, which may be in the form of rods extending perpendicular to the plane of the cathodes or which may be in the form of plates extending along the direction of the cathodes and perpendicular to the plane thereof may be disposed within the envelope to cooperate with these cathodes to produce a negative glow in the optical ring path and connections may be similarly made thereto, possibly through the opposite side of the envelope. Alternatively, those anodes may be formed by the envelope itself, which, in any case, should be held at a potential relative to the cathodes such that undesirable discharges are not set up thereto. The planes of the cathodes may be parallel to the top and bottom of the cylindrical envelope as shown if individual plate-anodes are used or they may be perpendicular thereto if the anodes are formed by the envelope itself. In any case the anode-cathode distances should preferably be small enough so that the gas discharge does not contain a so-called "anode glow" part.

The reflecting surfaces of the mirrors are also contained within the envelope and the mirrors themselves are attached to flexible vacuum-tight diaphragms 8 welded to the envelope. These diaphragms may be deformed by means of adjusting screws 9 provided at the positions of one or more of the mirrors in order to align the optical ring path with the cathodes. If more, sensitivity is required for this adjustment the screws 9 may be replaced by simple lever mechanisms.

Light may be extracted from the ring in the same manner as described above with reference to FIGURE 1. If the diaphragms extend along the back of the mirrors, that diaphragm adjacent the partly transmitting mirror must be pierced, the diaphragm itself then being sealed to the mirror in a vacuum tight manner in order to preserve the atmosphere inside the envelope.

The mirrors may be formed in situ during manufacture by evaporating for example, gold, silver or aluminum films on to glass blanks after sealing and degassing the envelope.

An advantage with the embodiment of FIGURE 2 is that the Brewster windows which have normally to be provided at the ends of the gas discharge tubes of conventional gas lasers are no longer required. The emission of these tends to reduce the losses occurring around the ring and also to reduce mixing of the light beams travelling in the two directions and hence therefore the coupling between these two beams, with the result that a fairly low difference-frequency may be obtained before the two oscillation frequencies "lock."

It may be necessary to stabilize the laser system of FIGURE 2 against changes in dimensions arising because for example, of temperature changes. This may be done for example by using light from one of the two rotating beams to actuate a feedback mechanism to keep the total length of the path constant.

As the operation of negative glow discharge lasers is apt to entail considerable sputtering of cathode material the mirrors 7, 7' and 7" of FIGURE 2 should be mounted at a sufficient distance from the cathodes 6 so that sputtered material will not cause deterioration in their reflectivity. Screen mounted in front of the mirrors and perpendicular to the beam, each with a small aperture to allow passage of the light beams may also be used to reduce this effect. In FIGURE 2 one or two of the cathodes together with the corresponding anodes may be emitted providing that sufficient gain is still available for oscillation to take place.

Figure 3:
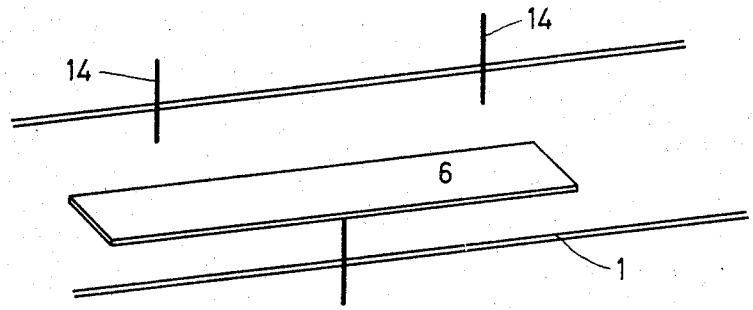

FIGURE 3 shows a possible construction of part of the laser tube 1 of FIGURE 1, the electrode arrangements of which may also be used with the system of FIGURE 2. The tube 1 may contain a laser atmosphere of, for example, 2% Ne and 98% He at about 20 mm. Hg for operation at $1.15\mu$. A flat cathode plate 6, for example of molybdenum 5 cm. long by 5 mm. wide, is arranged to cooperate with and be near enough to anode rods 14 so that a negative glow gas discharge is produced when a potential is applied.

For cases where the presence of anode glow is not detrimental to the operation of the device the anode rods may be made, for example, of 1.5 mm. diameter wire with about 8 mm. inside the envelope for taking current from the discharge and provided at their ends inside the envelope with electrically conducting discs (not shown) of, for example, 7 mm. diameter in order to provide additional areas of conductor to which the current discharge may take place in operation and to dissipate the heat generated. These discs may be approximately parallel to the plate 6 and spaced about 6 mm. therefrom. If anode glow must be eliminated an anode wire or plate must be used mounted close and parallel to the long axis of the cathode.

At low discharge currents the negative glow will be adjacent the upper surface of the plate; as the current is increased the glow may extend to the other side of the plate. If, desired the lower side of the plate as viewed in the figure may be coated with a layer of insulating material to inhibit this spreading. The laser beam ring path lies along the top of the cathode through the negative glow region. If necessary to provide sufficient gain, a multiple cathode arrangement may be obtained by placing several of the electrode combination of FIGURE 4 along the ring path. The tube 1 may be provided with Brewster angle windows at its ends if it is used in the system of FIGURE 1.

Figure 4:
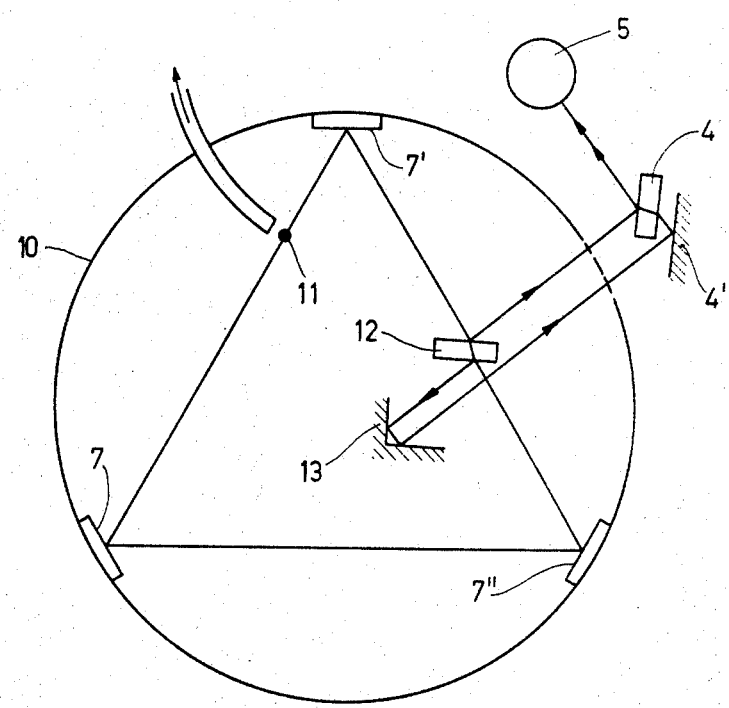

FIGURE 4 shows two alternative means for extracting a portion of the light from the ring.

A first means comprises a thin wire 11 inserted in the ring path. Light travelling around the ring in either directon may be scattered by this wire and a portion of the scattered light may be allowed to escape from the envelope via a suitable window or glass fibre-optical element and fall upon an external photo-sensitive element. Alternatively the scattered light may be detected by an internal element.

An alternative means comprises an optical plate 12 inserted in the ring path and arranged to act in conjunction with the mirror 13. Light travelling clockwise round the ring may be transmitted to the exterior by reflection at the plate 12 and light travelling anticlockwise may be transmitted to the exterior by reflection at the plate 12 and the mirror 13. Again, as an alternative, the scattered light may be detected by an internal element.

What we claim is:

1. A cold-cathode glow-discharge ring laser system comprising an envelope enclosing the ring path and containing a gaseous atmosphere, said envelope also containing a plurality of cathodes disposed along said ring path and an anode for cooperating to produce the glow discharge and hence population inversion in said atmosphere, the laser system also comprising means for producing a laser beam along the ring path extending into the region occupied, in operation, by the negative glow portion of the discharge.

2. A system as claimed in claim 1 wherein said cathode and anode are arranged so that the glow discharge occurs in a direction substantially perpendicular to said ring path.

3. A system as claimed in claim 1 wherein said envelope is arranged to co-operate with said cathodes as an anode for the discharge.

4. A system as claimed in claim 1 wherein the envelope also contains a photo-detector for the laser beam.

5. A cold-cathode glow-discharge ring laser system as claimed in claim 1 in which mirrors are provided within the envelope to form a closed loop.

6. A system as claimed in claim 5 in which the mirrors are attached to vacuum-tight diaphragms secured to the envelope.

7. A system as claimed in claim 6 including means to deform the diaphragms in order to align the optical ring path with the cathodes.

References Cited

Electrical Engineering, vol. 82, No. 4, p. 290, April 1963.

Smith: "Optical Maser Action in the Negative Glow Region of a Cold Cathode Glow Discharge, Jour. of App. Phys., vol. 33, pp. 723–4, March 1964.

JEWELL H. PEDERSEN, Primary Examiner

E. BAUER, Assistant Examiner

U.S. Cl. X.R.

356—106